United States Patent [19]
Keeley et al.

[11] Patent Number: 5,491,790
[45] Date of Patent: Feb. 13, 1996

[54] POWER-ON SEQUENCING APPARATUS FOR INITIALIZING AND TESTING A SYSTEM PROCESSING UNIT

[75] Inventors: James W. Keeley, Nashua, N.H.;
Richard A. Lemay, Carlisle, Mass.;
Chester M. Nibby, Jr., Beverly, Mass.;
Keith L. Petry, North Reading, Mass.;
Thomas S. Hirsch, Bedford, Mass.

[73] Assignee: Bull HN Information Systems Inc., Billerica, Mass.

[21] Appl. No.: 231,856

[22] Filed: Apr. 22, 1994

Related U.S. Application Data

[63] Continuation of Ser. No. 775,864, Oct. 15, 1991, abandoned.

[51] Int. Cl.$^6$ .................................................. G06F 9/445
[52] U.S. Cl. ............... 395/183.12; 395/405; 395/421.07
[58] Field of Search ...................... 395/400, 425, 395/575, 725, 183.12, 405, 421.07; 371/16.1

[56] References Cited

U.S. PATENT DOCUMENTS

| | | | |
|---|---|---|---|
| 4,315,311 | 2/1982 | Causse et al. | 395/575 |
| 4,646,298 | 2/1987 | Laws et al. | 371/16.1 |
| 4,713,759 | 12/1987 | Yamagishi et al. | 395/425 |
| 4,953,165 | 8/1990 | Jackson | 371/16.1 |
| 4,992,930 | 2/1991 | Gilfeather et al. | |
| 5,005,172 | 4/1991 | Kawamoto | 371/18 |
| 5,018,062 | 5/1991 | Culler et al. | 395/425 |
| 5,146,581 | 9/1992 | Kaneko | 395/425 |
| 5,173,903 | 12/1992 | Zelley et al. | 371/16.1 |
| 5,226,136 | 7/1993 | Nakagawa | 395/425 |

FOREIGN PATENT DOCUMENTS

| | | |
|---|---|---|
| 0205692 | 12/1986 | European Pat. Off. . |
| 57-113126 | 7/1982 | Japan . |
| 8809008 | 11/1988 | WIPO . |

*Primary Examiner*—Ken S. Kim
*Attorney, Agent, or Firm*—Faith F. Driscoll; John S. Solakian

[57] ABSTRACT

A processing unit couples to a system bus in common with a peer processor, a main memory, in addition to other units, and includes a microprocessor which tightly couples to a local memory also accessible from such bus. The processing unit also includes an addressable electrically erasable programmable read only memory (EEPROM) unit which is coupled to the microprocessor and the system bus. The EEPROM unit stores in first and second separate regions, both of which occupy the same address space normally allocated for storing the microprocessor's boot code, onboard diagnostic (OBD) routines and operating system boot routines, respectively. EEPROM control circuits at power-up, condition the EEPROM unit to address the first region for executing OBD routines to verify that the processing unit is operating properly, including the ability to properly issue commands to units connected to the system bus. Following loading of the peer processor operating system, the EEPROM control circuits, in response to commands from the system bus, enable the microprocessor to address the second region for executing boot routines for loading its operating system.

12 Claims, 8 Drawing Sheets

XCP/MICROPROCESSOR PRIVATE MEMORY ADDRESS SPACE MAP

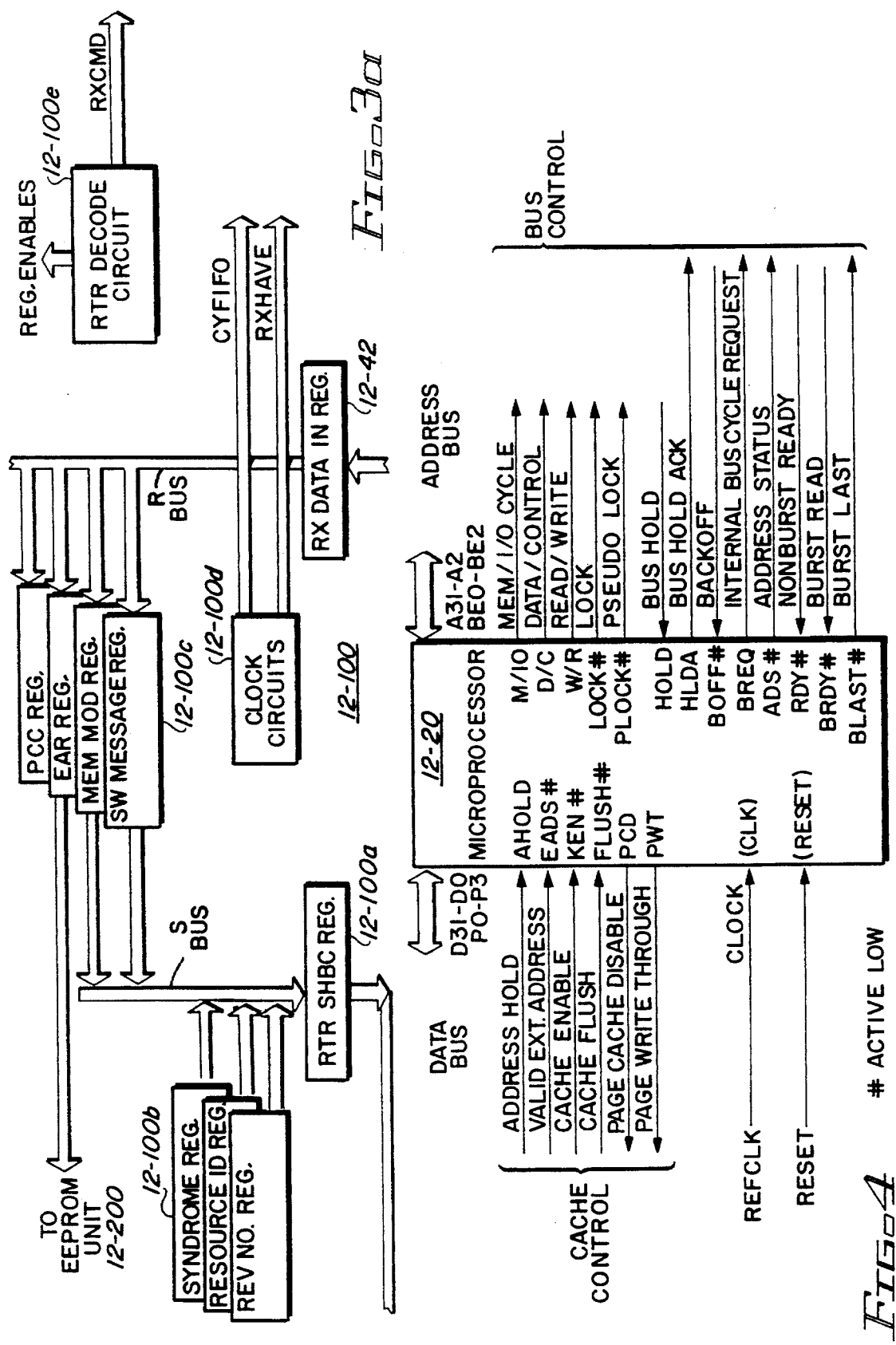

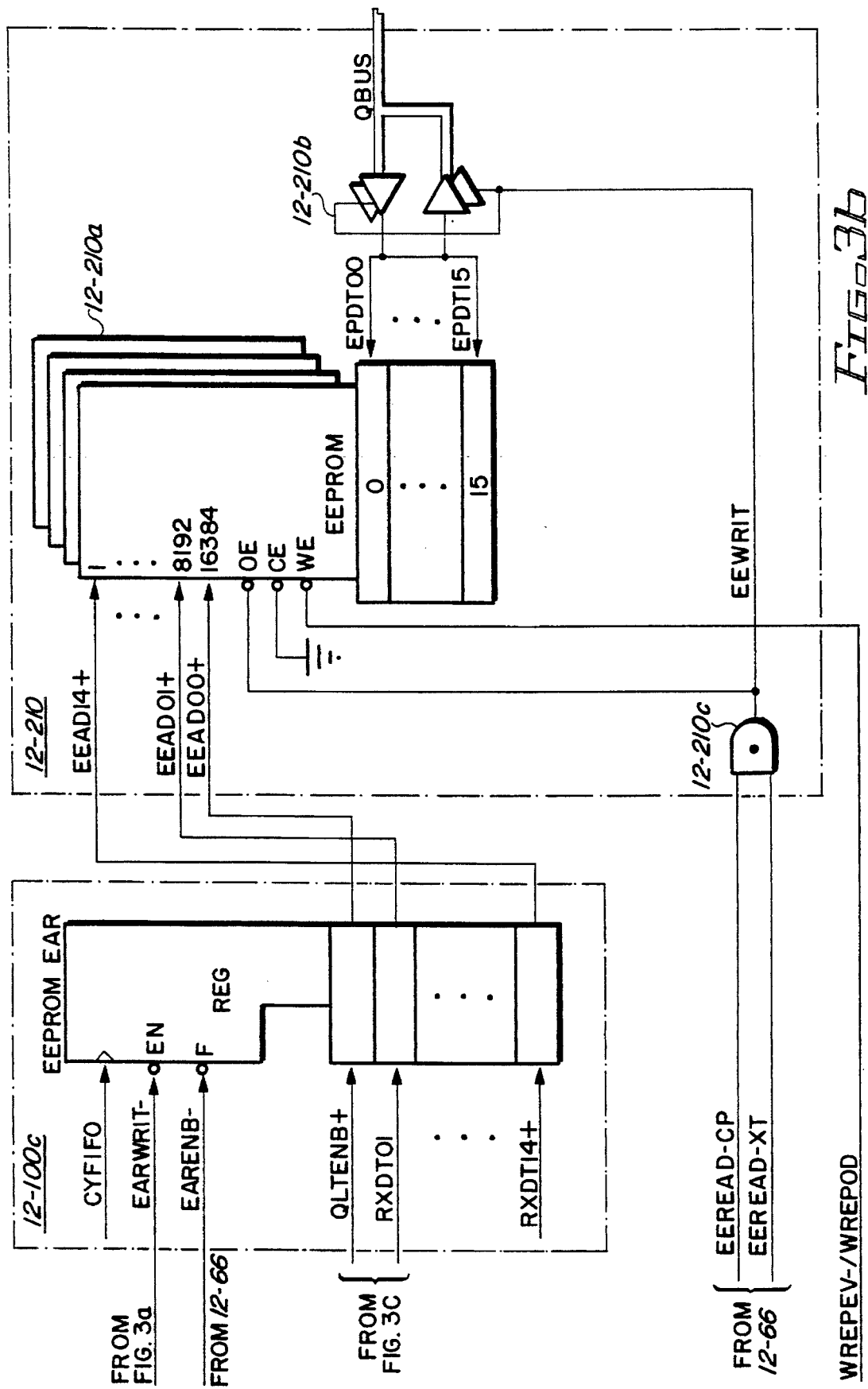

XCP/MICROPROCESSOR PRIVATE MEMORY ADDRESS SPACE MAP

POWER-ON SEQUENCING APPARATUS FOR INITIALIZING AND TESTING A SYSTEM PROCESSING UNIT

This is a continuation of application Ser. No. 07/775,864 filed on Oct. 15, 1991 now abandoned.

RELATED APPLICATIONS

1. The patent application of Thomas F. Joyce, James W. Keeley and Richard A. Lemay entitled "Programmable Bus State Machine," filed on Oct. 4, 1991, bearing Ser. No. 07/771,297, which is assigned to the same assignee as this patent application.

2. The patent application of Keith L. Petry, Thomas S. Hirsch and James W. Keeley entitled, "On-Board Diagnostic Testing," filed on Oct. 15, 1991, bearing Ser. No. 07/776,953, which is assigned to the same assignee as this patent application.

BACKGROUND OF THE INVENTION

1. Field of Use

The present invention relates to data processing apparatus and, more particularly, to apparatus for initializing a system to a predetermined state.

2. Prior Art

Certain prior art multiprocessing systems include a peer processor which operates under the control of a proprietary operating system and another peer processor which operates under the control of a nonproprietary operating system such as a UNIX™ operating system. An example of this type of system is described in U.S Pat. No. 4,992,930.

™ UNIX is a registered trademark of Unix System Laboratories, Inc.

In the above multiprocessor system, the nonproprietary peer processor was placed in an idle state while the remainder of the system, under the control of the proprietary peer processor, performed internal testing operations following the successful completion of which the system loaded the proprietary operating system. Thereafter, the nonproprietary peer processor was tested, loaded with a boot program and then its operating system.

The above arrangement was quite time-consuming and also required that the entire multiprocessor system be reset in order to verify the operability of the nonproprietary peer processor. Additionally, the nonproprietary peer processor was constructed from an Intel 80386 microprocessor chip and did not contain the extensive functionality of newer microprocessor chips and therefore did not require the same level of overall testing.

In systems which contain a board having a commodity processor and its own memory, a boot memory is used for storing BIOS which is the first code executed when the processor is reset or initialized. Normally, such memories are constructed from PROMs which can only be changed by replacing the PROM chips. Therefore, if the board was installed as part of a multiprocessor system, additional apparatus would be required for performing diagnostic testing before booting took place. Also, facilities would have to be provided for loading the diagnostic test routines in some way into the board's memory.

Accordingly, it is primary object of the present invention to provide a system which enables a processing unit to perform diagnostic testing and boot up its operating system.

SUMMARY OF THE INVENTION

The above and other objects of the present invention are achieved according to a preferred embodiment of a processing unit which couples to a system bus of a system, including a peer processor, a main memory, in addition to other units. The processing unit includes a microprocessor and a local memory which are also accessible from the system bus. According to the present invention, the processing unit further includes an addressable electrically erasable programmable read only memory (EEPROM) unit which also couples to the microprocessor and the system bus. The EEPROM unit is organized to store diagnostic test routines and operating system boot routines, respectively in first and second regions or sections which both have the same address space normally allocated for storing the microprocessor's boot routines. The EEPROM unit further includes address control circuits which couple to the system bus and at power-up automatically condition the EEPROM unit to address the first region for executing on-board diagnostic (OBD) routines to verify that the processing unit is operating properly. This includes executing routines which verify that the processing unit can properly issue system bus commands to memory and other units which connect to the system bus.

After the processing unit is determined to operate properly, the address control circuits, in response to commands from the system bus, condition the EEPROM unit to address the second region. This causes the microprocessor to execute boot routines which loads its operating system into local memory.

The arrangement of the present invention enables the processing unit to operate in two different modes, a first mode during power-up in which it runs OBD routines and a second mode during which it boots up the application operating system. The EEPROM unit enables rewriting or reloading the contents of the region containing the boot routines as required following examination and verification after successful completion of the OBD routines. This facilitates making updates and revisions to the system.

Additionally, the region containing the OBD routines can also be examined, modified or completely reloaded prior to the system issuing a reset command. This facilitates the testing of the OBD routines or the rerunning of the OBD routines without having to reset the entire system.

The above and other objects of the present invention will be better understood from the following description when taken in connection with the accompanying drawings.

BRIEF DESCRIPTION OF THE DRAWINGS

FIGS. 3a, 3b, and 3c together show in greater detail, the EEPROM unit of FIG. 2.

FIG. 4 shows in block form, the microprocessor of FIG. 2.

DETAILED DESCRIPTION OF THE PREFERRED EMBODIMENT

Figure 1:
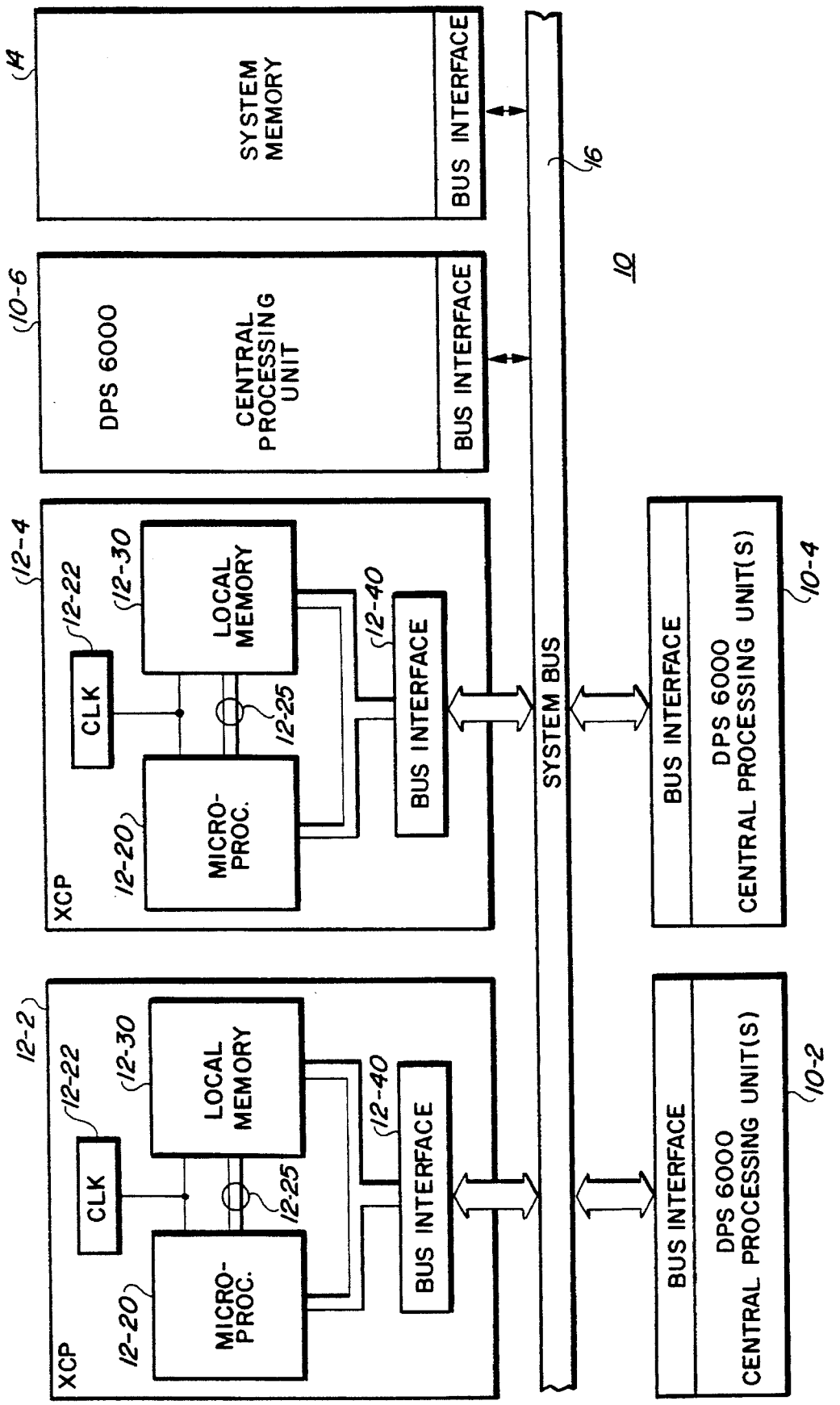
FIG. 1 is a block diagram of a multiprocessor system which incorporates the processing unit of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40, as shown. The microprocessor 12-20 and local memory 12-30 are tightly coupled through a local processor bus 12-25. The microprocessor 12-20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX operating system.

In FIG. 1, the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Figure 2:
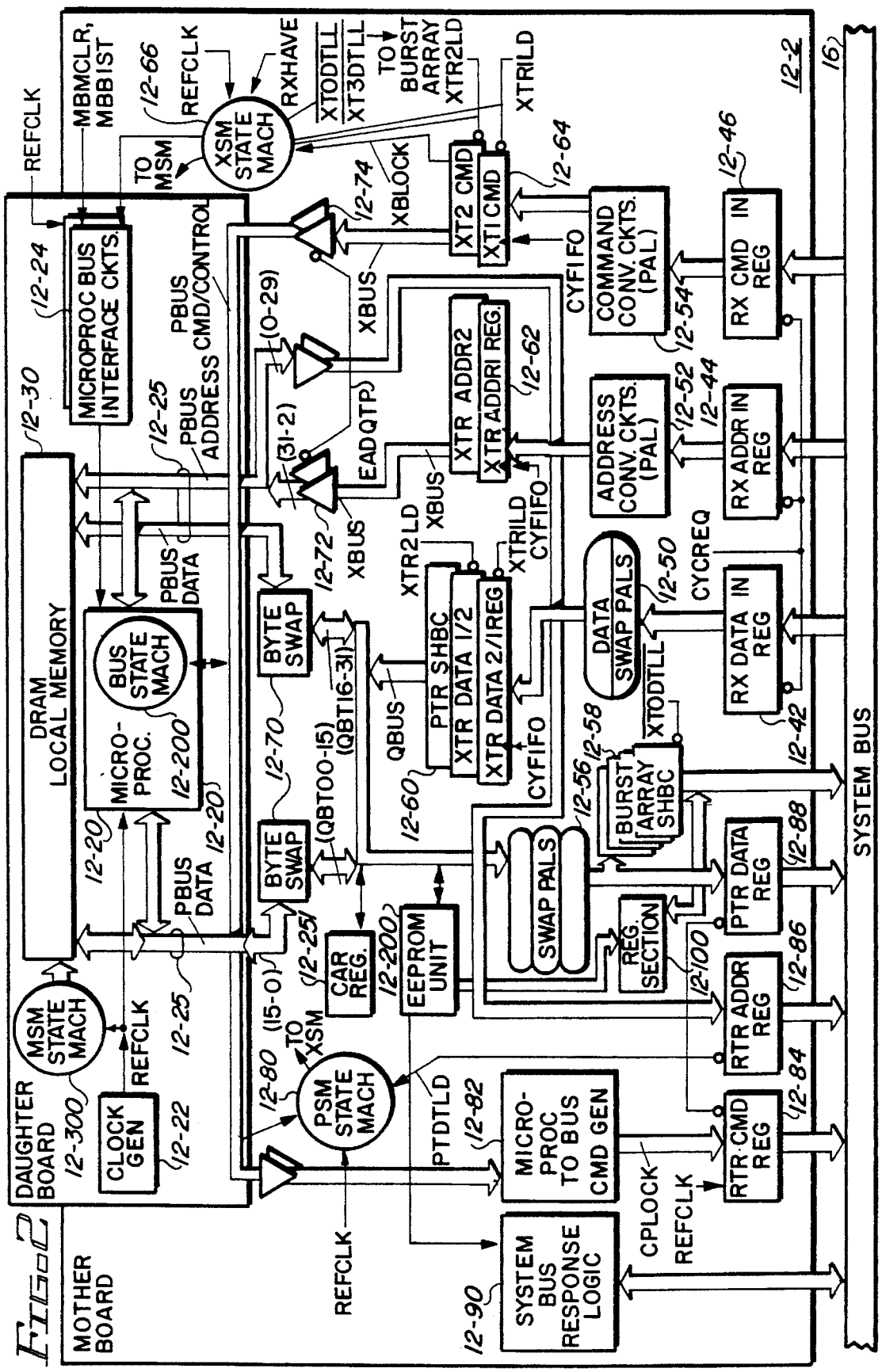
FIG. 2 shows in greater detail, the processing unit of FIG. 1.

Description of FIG. 2

FIG. 2 shows in greater detail, the processor 12-2 of FIG. 1. In the preferred embodiment, the microprocessor 12-20 and local memory 12-30, along with associated state machines 12-200 and 12-300, control circuits, in addition to clock generation circuits of block 12-22 are contained on a single daughter board, as shown. The clock generator circuits of block 12-22 generate a single frequency clock signal CLKREF of 33 MHz which provides the fundamental timing and internal operating frequency for microprocessor 12-20, in addition to all of the other circuits which make up processor 12-2. The system and bus interface circuits 12-24, input and output registers and state machines 12-80 and 12-66 are contained on the mother board. These two boards make up the entire processor.

In greater detail, the microprocessor 12-2 and local memory 12-30 are tightly coupled to the address, data and command/control processor bus lines of local bus 12-25, as shown. The circuits of block 12-24 serve as interface circuits which apply control signals to the microprocessor's bus interface which couples internally to the bus state machine 12-200. State machine 12-200 is used to control the microprocessor's access to local bus 12-25 by the generation of the proper bus protocol as a function of control signals generated by external state machine (XSM) 12-66. As explained herein, the XSM 12-66 controls the accessing of local memory 12-30, in response to external requests received from system bus 16.

As shown, the external requests received from system bus 16 are loaded into the receive data, address and command registers 12-42 through 12-46, in response to an enable signal CYCREQ generated by clock logic circuits, not shown. The address and command signals are converted into the appropriate form by address and command converter circuits of blocks 12-52 and 12-54 and stored in available registers of the two sets of queue registers of blocks 12-62 and 12-64. As shown, the registers of block 12-62 connect in common through tristate circuits to an output bus (X bus). Thereafter, the stored address and command signals are applied to the processor bus via the driver circuits of blocks 12-72 and 12-74, in response to an enabling signal EADQTP.

Any data associated with an external request loaded into register 12-42 is reordered as required by the programmable array logic (PALs) of block 12-50 and stored into the appropriate one of the registers of block 12-60 which connect in common to an output bus (Q bus) through tristate circuits. The different bytes of the data words are swapped from the so-called big endian format of the system bus to the little endian format utilized by microprocessor 12-20. This is accomplished by byte swap circuits of block 12-70 which is implemented by the proper reordering of connector pin connections.

The processor state machine (PSM) of block 12-80 controls the transfer and processing of transactions or requests initiated by microprocessor 12-20. As shown, commands generated by microprocessor 12-20 specifying an operation on system bus 16 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively, via an address bus and the Q data bus as shown in FIG. 2. This is all done in response to an enabling load signal PTDTLD generated by the PSM state machine 12-80 of control signals applied as an input to generator 12-82 and to the system bus response circuits of block 12-90.

Additionally, the PSM 12-80 processes internal I/O requests initiated by microprocessor 12-20 for reading/writing different ones of a plurality of internal registers 12-68 connected to the Q bus. These registers include a channel address register (CAR). The CAR register is used to store channel number information transmitted to system bus 16 as part of an I/O command during normal I/O operations. The CAR register is described in greater detail in the Appendix.

Also, as seen from FIG. 2, the processing unit 12-2 further includes a register section 12-100 which is part of a separate interface. This section contains a plurality of system visible registers and is shown in greater detail in FIGS. 3a and 3b.

Figure 3C:
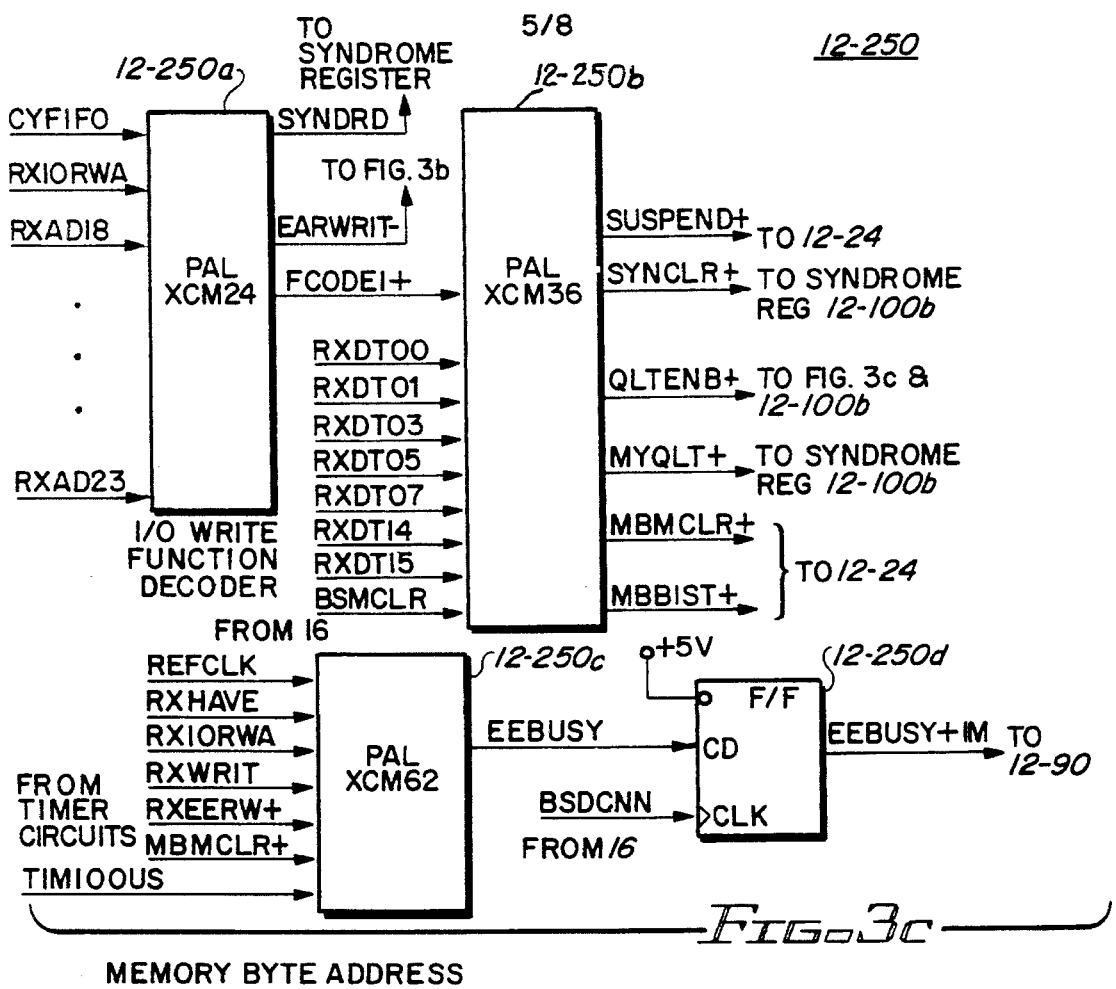

According to the present invention, processing unit 12-2 further includes an electrically erasable programmable read only memory (EEPROM) unit 12-200. This unit includes an EEPROM memory section 12-210 and an EEPROM control section 12-250 which are shown in greater detail in FIGS. 3b and 3c. As described herein, the EEPROM unit 12-200 is organized as two 64 kilobyte regions both of which occupy the last 64 kilobytes of the 4 gigabyte address space of microprocessor 12-20. It is addressable from system bus 16 through register section 12-100 which includes an external EEPROM address register as shown in FIG. 3a. It also couples to the Q bus which is used to transmit and receive data bytes from system bus 16, in addition to providing read access by microprocessor 12-20.

As shown, the EEPROM control section 12-250 provides an EEPROM busy output signal EEBUSY as an input to system bus response logic of block 12-90. This enables the writing of the EEPROM section 12-210 to take place without interference as explained herein.

Description of FIGS. 3a through 3c

FIG. 3a shows in greater detail, the system visible registers and associated control circuits of register section 12-100. The processing unit 12-2 further includes a plurality of system visible registers which are accessible via system bus 16 by microprocessor 12-20 or by any other system bus unit. A number of these registers connect in common to a receive bus (R Bus), as shown, for receiving input data from the RX DATA IN register 12-42.

These registers include a processor control command register (PCC) which comprises a plurality of flip-flop register stages, an EEPROM address register (EAR), a memory module register (MMR) and a software message register (SMR). As shown, the SMR and MMR registers also connect in common to a send bus (S Bus) for reading out of their contents to system bus 16 via a receive transfer second half bus cycle register (RTSHBC) 12-70.

Other system visible registers whose contents are only read, also connect in common to the S Bus. These registers include a syndrome register (SYN), a resource identification register (ID) and a revision number register (REV). The ID and REV registers which store constant values in addition to the MMR register are implemented in a programmable array logic (PAL) circuit while the other registers are implemented using standard register circuits.

The system visible registers are accessed in response to I/O commands applied to system bus 16 which results in the storing of address and command signal in registers 12-44 and 12-46. The address and command signals are decoded by the decode circuits of the RTR Control block 12-90. The system visible registers are described in greater detail in the Appendix.

FIG. 3b shows in greater detail, the external EEPROM register 12-100c and the EEPROM memory section 12-210. As shown, register 12-100c receives FIFO clock signal CYFIFO from clock circuits 12-100d of FIG. 3a, a write control signal EARWRIT−, and an enable signal EARENB− from the EEPROM control section 12-250. Control signal QLTENB+ is applied to the most significant address bit position of external EEPROM register 12-100c. The remaining address bit positions receive signals RXDT01+ through RXDT14+ from system bus 16 through RX DATA IN register 12-42. The output contents of EAR register 12-100c in response to signal EARENB− are applied as signals EEAD00+ through EEAD14+ to the address input terminals of a plurality of EEPROM chip circuits 12-210a of EEPROM memory section 12-210. Additionally, the circuits 12-250a receive an output enable signal EEWRIT from an AND gate 12-210c. This AND gate is enabled in the absence of an EEPROM read signal EEREAD-CP or EEREAD-XT from either PSM 12-80 or XSM 12-66. Additionally, XSM 12-66 provides write enable signals WREPEV− and WREPOD as shown.

The input/output data terminals of EEPROM circuits 12-210a connect to the Q bus through bidirectional driver circuits of block 12-210b as shown transmit and receive signals EPDTOO through EPDT15. The driver circuits of block 12-210a are enabled by the state of signal EEWRIT.

FIG. 3c shows in greater detail, the EEPROM control circuits 12-250a through 12-250d of EEPROM control section 12-250. As seen from FIG. 3c, these circuits include programmable array logic (PAL) circuits 12-250a through 12-250c and D-type flip-flop 12-250d. The PAL circuit 12-250a receives signal CYFIFO from clock circuits 12-100d of FIG. 3a and I/O read/write acknowledge signal RXIORWA+ and address signals RXAD18 through RXAD23 from the registers 12-44 and 12-46. PAL circuit 12-250a decodes these signals and generates as outputs, function code 1 signal FCODE1+, syndrome register signal SYNDRD− and EAR register write signal EARWRIT−.

The PAL circuit 12-250b receives clock reference signal REFCLK, signal RXHAVE from the clock circuits 12-100d of FIG. 3a, data signals RXDT00+ through RXDT15+ from register 12-42 in addition to system master clear signal BSMCLR− from system bus 16. In response to these signals, in addition to the signal FCODE1, PAL circuit 12-250b generates as outputs, suspend operation signal SUSPEND, syndrome register clear signal SYNCLR+, QLT enable signal QLTENB+, my QLT signal MYQLT+, bus master clear signal MBMCLR+ and bus built-in self-test signal MBBIST+. The signals SUSPEND+, MBMCLR+, and MBBIST+ are applied as inputs to the bus control circuits of block 12-24 of FIG. 2. The signals SYNCLR+, MYQLT+ and QLTENB+ are applied as inputs to the syndrome register included in block 12-100c of FIG. 3a. Additionally, signal QLTENB+ is applied as an input to the EAR register of FIG. 3b.

The PAL circuit 12-250c receives as inputs, clock reference signal REFCLK, signal RXHAVE+, signal RXIORWA+, write signal RXWRIT from bus 16, EEPROM read/write signal RXEERW+ from bus 16, bus master clear signal MBMCLR+ from bus 16 and a one hundred microsecond timer signal TIM100US from conventional timer circuits included within PSM 12-80. PAL circuit 12-250c generates EEPROM busy signal EEBUSY+ which is stored in flip-flop 12-250d in response to bus data cycle now signal BSDCNN+ from bus 16. The flip-flop 12-250d applies output EEPROM busy signal EEBUSY+m to the bus response circuits of block 12-90 of FIG. 2. The equations and descriptions of the PAL circuits of FIG. 3c are set forth in the Appendix.

Description of FIG. 4

FIG. 4 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability. The cache control section includes six pins for controlling the microprocessor's internal cache. The cache enable (KEN) input is most frequently used to disable areas of memory that cannot be cached.

The address hold (AHOLD) and external address strobe (EADS) inputs allow an external device to present the microprocessor 12-20 with an address. If the address matches an address in the microprocessor's internal cache, the associated data is flagged as invalid. The flush (FLUSH) cache input is used to inform the microprocessor that the entire contents of its cache are invalid. The page write-through (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus under the microprocessor's bus control state machine. The bus request (BREQ) output signal indicates that the microprocessor needs the address/data bus. The back off input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA), in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete.

The non-maskable interrupt request signal indicates when an external non-maskable interrupt has been generated. The NMI signal must be held in a low state for at least four clock periods before rising in order to be properly detected during a particular clock cycle.

For further information regarding the use of these signals, reference may be made to the Intel publication entitled, "i486 MICROPROCESSOR," dated November, 1989, Order Number: 240440-002.

The RESET input forces microprocessor 12-20 to a known state. The microprocessor 12-20 includes a built-in self-test capability (BIST) which tests its non-random logic, control ROM, translation lookaside buffer (TLB) and on-chip cache memory. The BIST is initiated by holding the AHOLD input high in the clock signal prior to the RESET input being switched from a high to low state. The BIST takes approximately 32 milliseconds to complete. The results of the BIST are stored in an internal register and have a value of ZERO when successfully completed.

DESCRIPTION OF OPERATION

Figure 5:
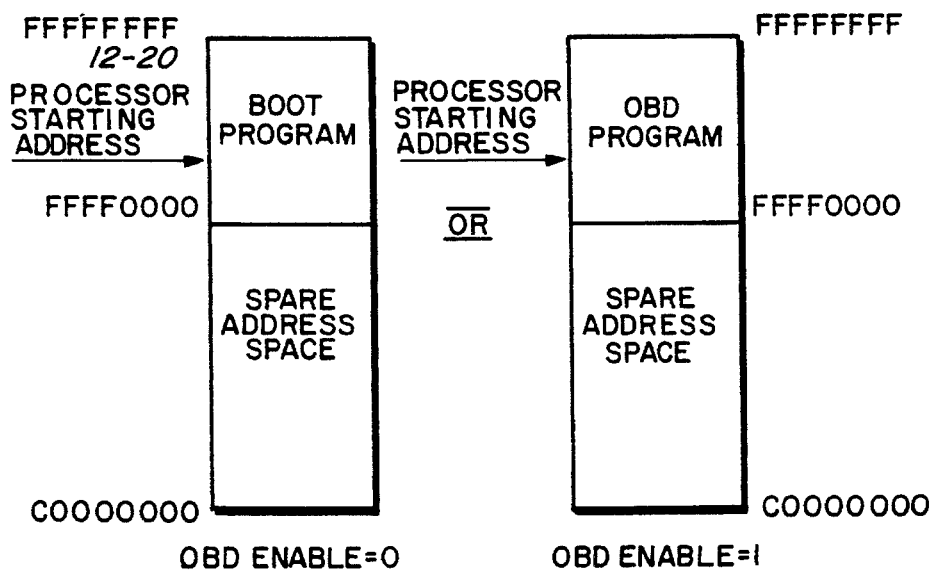
FIG. 5 illustrates a private memory address space map according to the present invention.

With reference to FIGS. 1 through 4, the operation of the power-on sequence apparatus of the present invention will now be described with reference to the diagrams of FIGS. 5 through 7. FIG. 5 illustrates the mapping of processing unit's private memory address space as a function of the state of address bit signal EEADOO+ which corresponds to the state of signal QLTENB+ generated by PAL circuit 12-250b of FIG. 3c. As shown, when signal QLTENB+ is a binary ONE as is the case when power is applied to the system, microprocessor 12-20 which is normally forced to a single starting address of FFFFFFF0 will execute instructions of the on-board diagnostic routines. However, when signal QLTENB+ is forced to a binary ZERO, microprocessor 12-20 will execute instructions of the boot routine. It is seen that these routines are overlayed and use the address space normally referenced by microprocessor 12-20. Hence, since microprocessor 12-20 always starts execution from the same starting address, the state of signal QLTENB+ determines which image or region will be used by the microprocessor.

Figure 6:
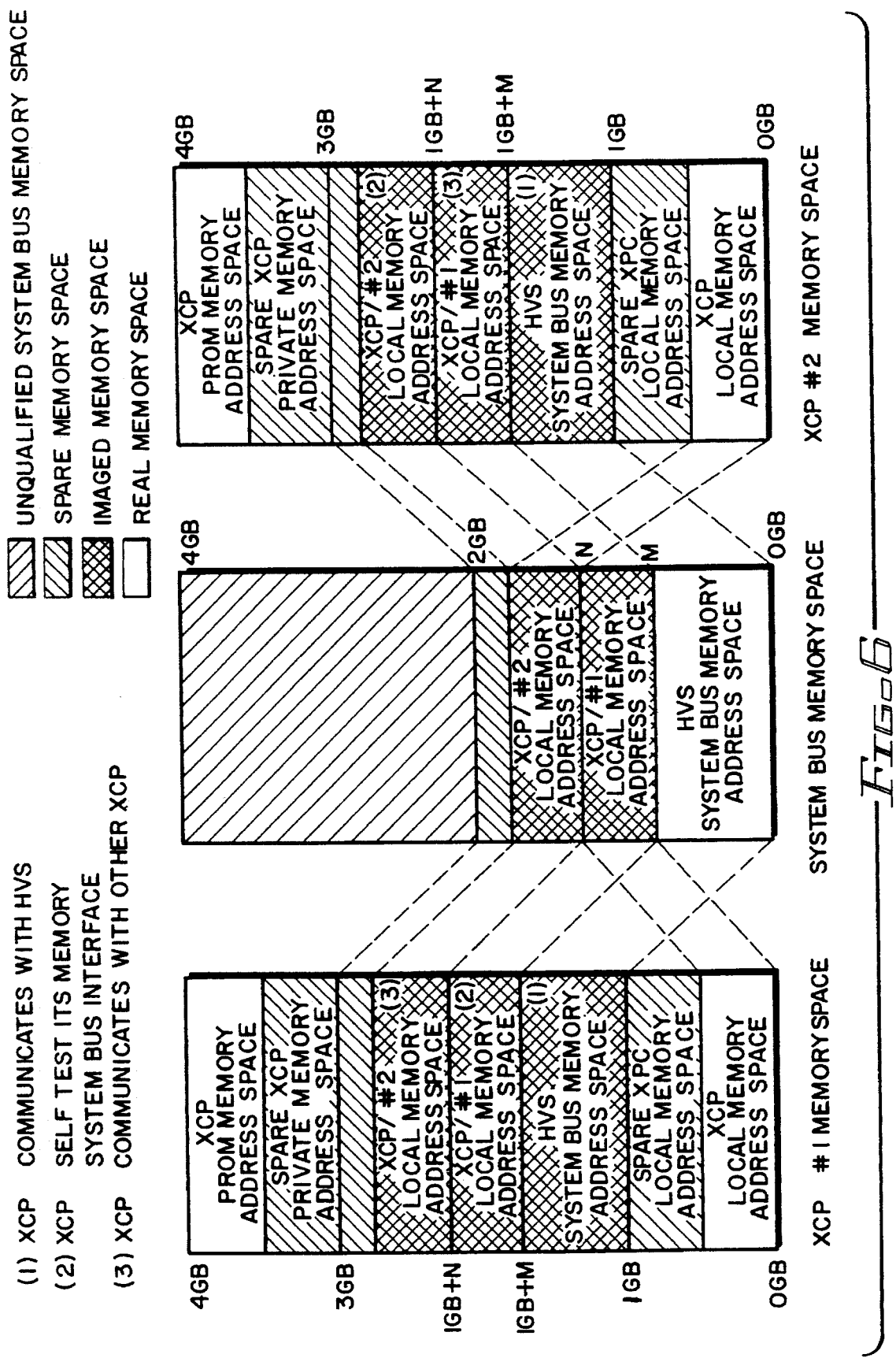
FIG. 6 illustrates a memory system space map according to the present invention.

FIG. 6 illustrates the address space of the system of FIG. 1. The usable HVS system address space is a 2 gigabyte addressable memory block which starts at location 0. This block contains the system real memory and images of the XCP microprocessor 12-20 memory. The XCP microprocessor address space is a 4 gigabyte memory block which includes the following three areas: (1) the first gigabyte memory area is reserved for the XCP microprocessor on-board (local) memory 12-30, (2) the second and third gigabyte memory areas are reserved for the system bus 16; and (3) the fourth gigabyte memory area is reserved for the XCP microprocessor private memory of FIG. 5.

The starting addresses of M or N of the XCP microprocessor image is assigned by the HVS operating system using the processing unit 12-2 memory module register of FIG. 3a. That is, when the HVS operating system addresses location M on the system bus 16, XCP processing unit 12-2 (e.g. #1) addresses location 0 in its address space. When XCP processing unit 12-2 (#1) addresses location 0 in its address space, it will again respond by accessing the same location 0 which the HVS operating system just accessed. When the XCP processing unit 12-2 (#1) addresses location 1GB+M in its address space, this is translated into system bus address M and then returned back to processing unit 12-2 causing it to again respond by accessing location 0 in its address space. This wrapping operation is required to be used in order to perform system bus testing during the execution of the on-board diagnostic routines.

During a power on sequence or when the signal QLTENB− is set to a binary ONE in response to a master clear operation, the memory module register of processing unit 12-2 is preloaded with a system bus address having a value of 2 gigabytes. This places XCP local memory addressing outside the addressable range supported by system bus 16. This prevents interference from peer processors operating under the control of the HVS operating system.

During the execution of the on-board diagnostic routines, a different address value is loaded into the memory module register of each XCP processing unit. This value is calculated by microprocessor 12-20 from the assigned channel number value. The assignment of different images to the XCP processing units of FIG. 1 allows each processing unit to execute the system bus test routine portion of the on-board diagnostic routines stored in its EEPROM unit without interference from each other.

The apparatus of the present invention enables the processing unit 12-20 to be tested in parallel with the remainder of the system prior to loading the HVS operating system. The preloading of the memory module register of processing unit 12-20 enables the unit to perform complete internal testing independent of the remainder of the system, including testing of its capability to perform system bus operations.

Figure 7A:
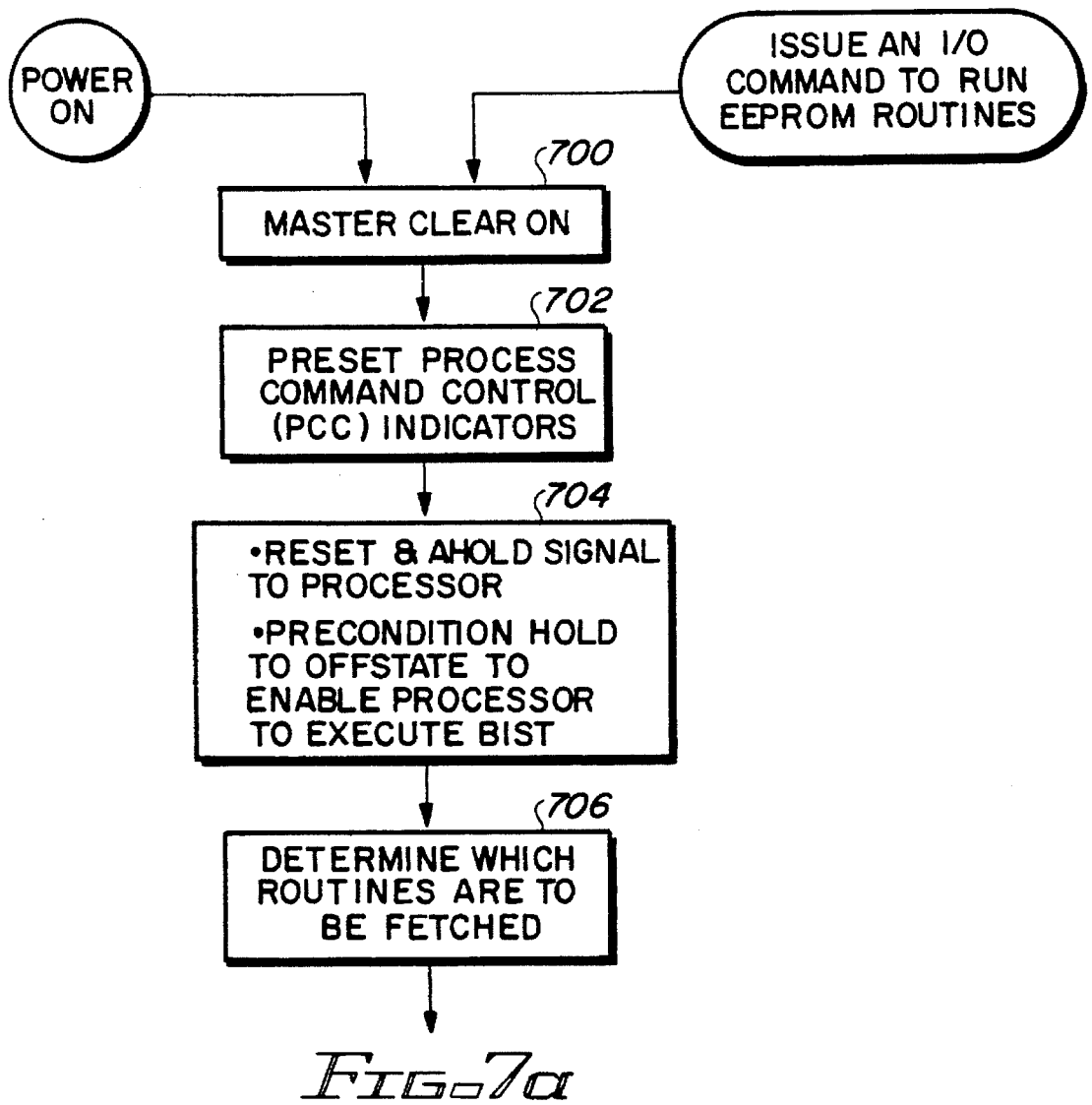
FIGS. 7a and 7b are flow charts used to describe the operation of the present invention.
Figure 7B:
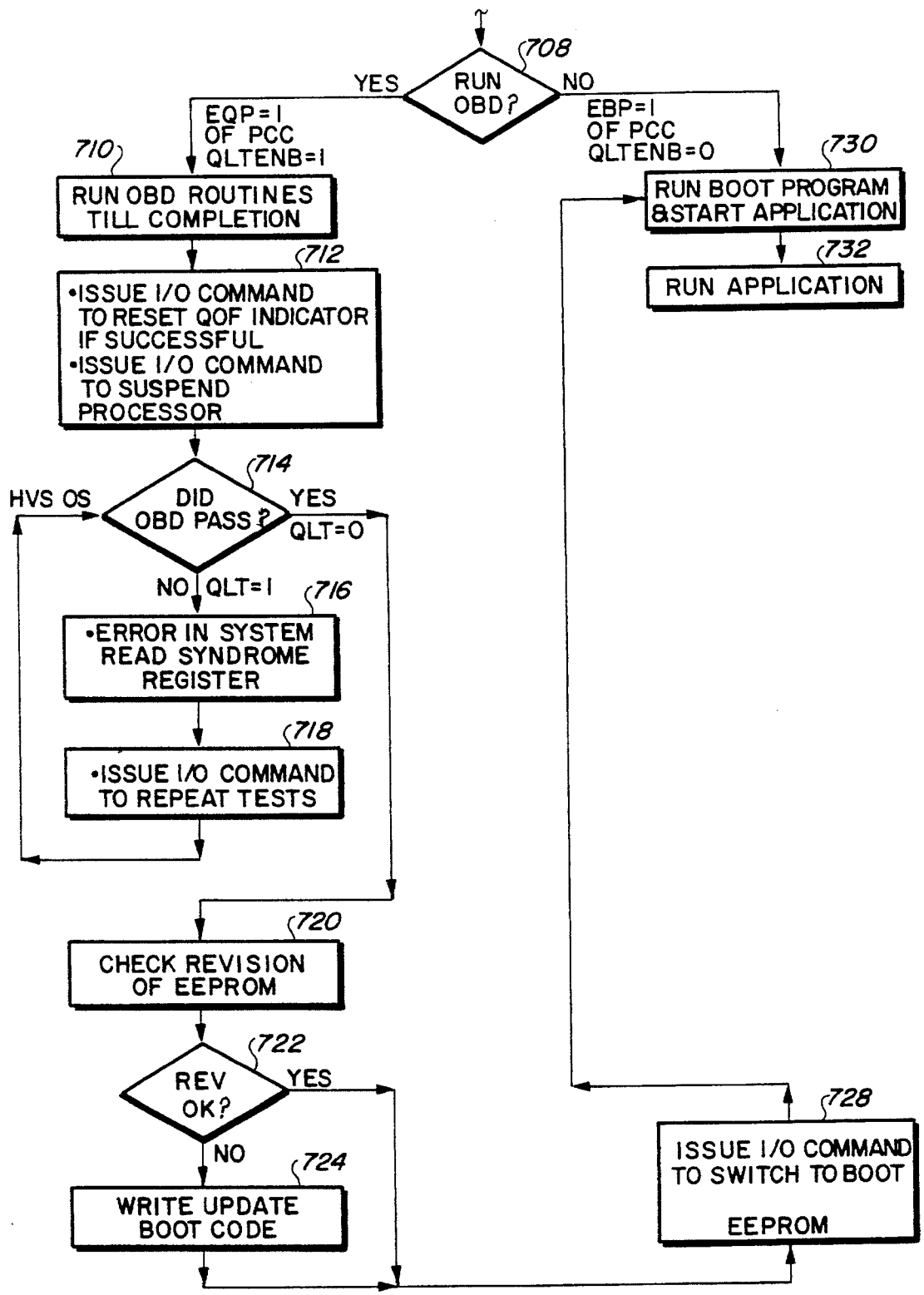

FIGS. 7a and 7b illustrate the manner in which processing unit 12-2 performs such internal testing using the apparatus of the present invention. Referring to the FIG. 7a, it is seen that in response to a power on condition, the system issues a master clear signal in block 700. This results in signal BSMCLR− being forced low. This results in the presetting of certain processor command bit signals. This causes the EEPROM control section PAL circuit 12-250b of FIG. 3c to force signals SUSPEND+, MBBIST+, MYQLT+, QLTENB+, MBMCLR+ and SYNCLR+ to the appropriate states.

The signals SUSPEND+, MBBIST+ and MBMCLR+ are applied to the bus control circuits 12-24 of FIG. 2. This results in application of a reset signal to the reset terminal of microprocessor 12-20 of FIG. 4, along with a signal to the AHOLD input terminal. Also, the HOLD input terminal is held in the off state. As seen from block 704, microprocessor 12-20 is conditioned to execute its BIST self-test routines. This verifies that the microprocessor 12-20 is operating properly.

Next, as indicated by block 706, processing unit 12-2 determines which routines are to be fetched from EEPROM unit 12-200. As previously discussed, the state of signal QLTENB+ generated by PAL circuit 12-250b determines which 64k byte region or section of EEPROM memory section 12-210 will be addressed. Since the sequence of operation occurred in response to a power on operation, signal QLTENB+ is a binary ONE which causes microprocessor 12-20 to run the on-board diagnostic routines to completion as indicated in block 710. This results in the resetting of the QLT indicator when testing is successfully completed as indicated in block 712.

Also, upon the completion of the OBD routines, the microprocessor 12-20 suspends its operation by generating a HOLD signal as indicated by block 712. This is done when the microprocessor 12-20 issues an I/O command specifying itself by designating its own channel number.

At this time, the HVS operating system software which will have been loaded into the system takes over and performs the operations of blocks 714 through 728. It can be seen that the apparatus of the present invention provides a substantial amount of flexibility in determining what steps should be taken by the operating system. First, the HVS operating system determines if the microprocessor 12-20 successfully completed the OBD routines. This is determined by examining the state of certain ones of the indicator bits contained in the syndrome register 12-100c of FIG. 3a. When the states of these bits indicate that there were no errors, the HVS operating system then checks the revision number of the boot code to ensure that it is up to date.

This is done by issuing I/O commands which specify reading the contents of the EEPROM unit 12-200. When the revision is not up to date, as determined by block 722, then the HVS operating system issues an I/O command specifying the writing of the EEPROM boot routine contents. The command upon being decoded causes the XSM 12-66 to generate the appropriate write signals which results in forcing signals WREPEV− and WREPOD− to binary ZEROS. Also, the PAL circuit 12-250c of FIG. 3c, in response to the EEPROM write command, forces EEPROM busy signal EEBUSY to a binary ONE state. This switches flip-flop 12-250d to a binary ONE state upon the occurrence of bus data cycle now signal BSDCNN. Flip-flop 12-250d remains set until the completion of the write operation which is determined by timer signals TIM1US and TIM100US.

During the writing of successive bytes into the EEPROM memory section 12-210, flip-flop 12-250d applies busy signal EEBUSY+1M as an input to the bus response logic of block 12-90 of FIG. 2. This causes the response logic to generate a negative response (NAK) for each command it receives from system bus 16 during the EEPROM write operation. This permits the system to continue its operation in parallel with the writing of EEPROM unit 12-200.

At the completion of the operation, the HVS operating system is then able to issue an I/O command to switch regions of the EEPROM unit 12-200 allowing the microprocessor 12-20 to execute instructions of the boot code routines. This is done by applying an I/O command to system bus 16 which contains a function code of "01 and data bit signal RXDT15 set to a binary ONE." Upon receipt of the I/O command, PAL circuit 12-250b causes signal QLTENB+ to be switched from a binary ONE to a binary ZERO state. As seen from FIG. 3b, signal QLTENB+ switches the state of address signal EEAD00+ to a binary ZERO. This results in having microprocessor 12-20 access the boot code routines as indicated in FIG. 5.

As seen from FIG. 7b, if the processing unit 12-2 failed its tests, the HVS operating system has the option of issuing an I/O command having an "01" function code and data bit signal PXDT14 set to a binary ONE defining a reset operation which causes the microprocessor 12-20 to repeat execution of the OBD routines.

As seen from FIG. 7b, microprocessor 12-20 completes the operations of blocks 730 and 732 at which time instructions of an application program can be run. It will be noted that a similar sequence of operations is performed when an I/O command with an "01" function code is issued initially causing the execution of block 702. Under this condition, the state of signal QLTENB+ may not be a binary ONE. Therefore, sequencing will then proceed to block 730.

The above has illustrated how the apparatus of the present invention is able to provide a means of independently powering up a processing unit of a system.

It will be appreciated by those skilled in the art that many changes may be made without departing from the teachings of the present invention. For example, the invention may be used in conjunction with different types of memory devices and commands. Also, while the preferred embodiment utilizes different PAL circuits to perform certain functions that such functions can be combined in certain instances and performed within a single circuit. Also, the invention is not limited to any specific type of circuit.

APPENDIX

I. SYSTEM VISIBLE REGISTERS

1. Processor Control Command (PCC) Register is a 16-bit register used for exercising overall control over processing unit 12-2. The PCC register is written in response to an I/O request containing a function code (address bits 18-23 on system bus 16) value of 01 (FC=01). The information directed to the PCC register arrives via an output control command with at least a binary ONE in a specific bit position of a 16-bit control word (system bus data bits BSDT00–BSDT15), indicating the particular control action requested to take place (e.g. reset or suspend microprocessor operation).

| Microprocessor View of Processor Control Command (PCC) | | | | | | | | | | |
|---|---|---|---|---|---|---|---|---|---|---|
| 10 | 09 | 08 | 07 | 06 | 05 | 04 | 03 | 02 | 01 | 00 |
| ... | EBP/ / /_Enable Boot Program | EQP/ /_Enable QLT Program | BST | SUS |  | RES |  | CSB | QON | QOF |

| System Bus View of PCC | | | | | | | | | | | | | | | |
|---|---|---|---|---|---|---|---|---|---|---|---|---|---|---|---|
| 00 | 01 | 02 | 03 | 04 | 05 | 06 | 07 | 08 | 09 | 10 | 11 | 12 | 13 | 14 | 15 |
| BST | SUS | RES | CSB | QON | QOF |  |  |  |  |  |  |  |  | EBP | EQP |
| / | / | / | / | / | /_Turn QLT ind. off | | | | | | | | | | |
| / | / | / | / | /_Turn QLT ind. on | | | | | | | | | | | |
| / | / | / | /_Clear Syndrome reg. | | | | | | | | | | | | |
| / | / | /_Resume with proc. after halt | | | | | | | | | | | | | |
| / | /_Suspend with proc. oper. | | | | | | | | | | | | | | |
| /_Reset with proc. to run built-in-self-test & start QLT or boot routines. | | | | | | | | | | | | | | | |

2. The Software Message Register (SMR) is a 16-bit register which is normally used by the operating systems to exchange messages therebetween. It is loaded from system bus 16. The SMR register is loaded from system bus 16 in response to an I/O command containing a function code (FC) value of 11 via data leads BSDT(00–15). The contents of the SMR register are placed on data leads BSDT(00–15) as part of a normal system bus response cycle, in response to an I/O command containing a function code (FC) value of 10.

b 3.The Revision-Number Register (RNR) is a read-only 16-bit constant register which contains the hardware revision number of the processor 12-2. The register contents are placed on the system bus data leads BSDT(00–15), in response to an I/O command containing a function code (FC) value of 22.

4. The Memory Module Register (MMR) stores a value interpreted as the starting address of the processor's on-board memory as seen from the system bus. The value is in terms of 16-Megabyte increments (i.e., the actual start address has 24 zero bits to the right of the number provided). The Memory Module Register is a read/write 8-bit register which contains an 8-bit module number. The Memory Module Register is loaded from system bus data leads BSDT(00–07) in response to an I/O command containing a function code (FC) value of 25. The contents of the Memory Module Register are placed on system bus data leads BSDT(00–07) and by placing zeroes on system bus data leads BSDT(08–15) in response to an I/O command containing a function code (FC) value of 24.

5. The Identification Register (IR) is a read-only 16-bit register which supplies a code constant to HVS operating system identifying it as a peer processor. The contents of the ID register are placed on data leads BSDT(00–15) as part of a normal system bus response cycle in response to an I/O command containing a function code (FC) value of 26.

6. The EEPROM Address Register (EAR) is loaded from system bus data leads BSDT(01–15) in response to an I/O command containing a function code (FC) value of 29. The EEPROM array contains two 64KB banks selected by QPE. The addressing range is 0000–7FFF sixteen-bit words (BSDT00 is ignored). The data from system bus data leads BSDT(00–15) is written into the 16-bit EEPROM "word-location" as addressed by the previous Load-EEPROM-Address-Register command in response to an I/O command containing a function code (FC) value of 2D. For each FC=2D command, 16 data bits are written into the EEPROM location specified by the EEPROM Address Register. The 16-bit EEPROM "word" as addressed by the previous Load-EEPROM-Address-Register command is placed on system bus data leads BSDT(00–15) in response to an I/O command containing a function code (FC) value of 28.

7. The Syndrome Register (SR) is a 16-bit read-only register which records the occurrence of unusual events encountered during operation of the processor 12-2. The Syndrome Register content is placed on data leads (BSDT(00–15) as part of a system bus response cycle in response to an I/O command containing a function code (FC) value of 3E.

II. PROCESSOR INTERNAL REGISTER a. Channel Address Register (CAR)

The channel address register is preloaded by software prior to issuing a series of I/O commands. It is a 16-bit register used to store an I/O channel number in bit positions 9-0 to be transmitted to the system bus 16 to specify the I/O destination address of a microprocessor issued INw/OUTw command on I/O operations. Additionally, bit positions 12-10 store the states of the M/IO, D/C, and W/R leads of each transaction issued by microprocessor 12-20. The CAR register is read in response to a function code value of 40 and written in response to a function code value of 41.

Microprocessor View of Channel Address Register

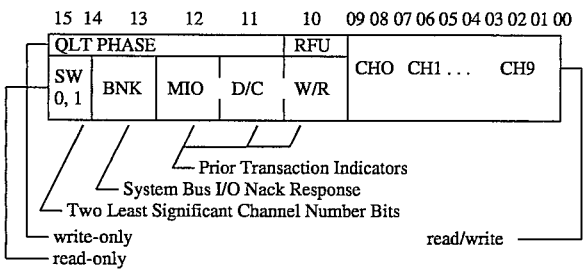

III. EEPROM CONTROL SECTION 12-250

Description of equation symbols: (Where #=OR: !=negation; and &=AND)

PAL Circuit 12-250a

MODULE XCM24

Pin Specifications:

|  |  |  |
|---|---|---|
| | (Inputs) | |
| | CYFIFO | PIN 1; |
| | RXINTA | PIN 2; |
| | RXIORWA | PIN 3; |
| | RXAD18 | PIN 4; |
| | RXAD19 | PIN 5; |
| | RXAD20 | PIN 6; |
| | RXAD21 | PIN 7; |
| | RXAD22 | PIN 8; |
| | RXAD23 | PIN 9; |
| | (Outputs) | |
| | !WRTIPS | PIN 23; |
| | !SMWRIT | PIN 22; |
| | !EARWRIT | PIN 21; |
| | !IPR0WR | PIN 20; |
| | !IPR1WR | PIN 19; |
| | FCODE1 | PIN 18; |
| | FCOOR31 | PIN 17; |
| | FCODE33 | PIN 16; |

Equates:

FCODE EQUATIONS = [RXAD18,RXAD19,RXAD20,RXAD21,RXAD22,RXAD23];

| | | |
|---|---|---|
| WRTIPS | = | CYFIFO & RXINTA; |
| SMWRIT | = | RXIORWA & (FCODE = ^H11); |
| EARWRIT | = | RXIORWA & (FCODE = ^H29); |
| IPR0WR | = | RXIORWA & (FCODE = ^H21); |
| IPR1WR | = | RXIORWA & (FCODE = ^H2B); |
| FCODE1 | = | RXIORWA & (FCODE = ^H01); |
| FCOOR31 | = | (FCODE = ^H00) # (FCODE = ^H31); |
| FCODE33 | = | (FCODE = ^H33); |

MODULE XCM25

Pin Specifications:

|  |  |  |
|---|---|---|
| | (Inputs) | |
| | CYFIFO | PIN 1; |
| | RXIORWA | PIN 3; |
| | RXAD18 | PIN 4; |
| | RXAD19 | PIN 5; |
| | RXAD20 | PIN 6; |
| | RXAD21 | PIN 7; |
| | RXAD22 | PIN 8; |
| | RXAD23 | PIN 9; |
| | (Outputs) | |
| | !IPR0RD | PIN 23; |
| | !IPR1RD | PIN 22; |
| | !SMREAD | PIN 21; |
| | !SYNDRD | PIN 20; |
| | RTSEL0 | PIN 19; |
| | RTSEL1 | PIN 18; |
| | RTSEL2 | PIN 17; |
| | !IOREAD | PIN 16; |

Equates:

FCODE EQUATIONS = [RXAD18,RXAD19,RXAD20,RXAD21,RXAD22,RXAD23];

| | | | | |
|---|---|---|---|---|
| IPR0RD | := | RXIORWA & (FCODE = ^H20); | | |
| IPR1RD | := | RXIORWA & (FCODE = ^H2A); | | |
| SMREAD | := | RXIORWA & (FCODE = ^H10); | | |
| SYNDRD | := | RXIORWA & (FCODE = ^H3E); | | |
| RTSEL0 | = | RXIORWA & | ((FCODE = ^H20) | # |
| | | | (FCODE = ^H2A) | # |
| | | | (FCODE = ^H10) | # |
| | | | (FCODE = ^H3E) | # |
| | | | (FCODE = ^H26) | # |
| | | | (FCODE = ^H24) | # |
| | | | (FCODE = ^H22)); | |
| RTSEL1 | = | RXIORWA & | ((FCODE = ^H25) | # |
| | | | (FCODE = ^H24) | # |
| | | | (FCODE = ^H22)); | |
| RTSEL2 | = | RXIORWA & | ((FCODE = ^H26) | # |
| | | | (FCODE = ^H22)); | |

```
IOREAD      =   RXIORWA &   ((FCODE = ^H10)     #
                            (FCODE = ^H20)      #
                            (FCODE = ^H22)      #
                            (FCODE = ^H24)      #
                            (FCODE = ^H26)      #
                            (FCODE = ^H2A)      #
                            (FCODE = ^H3A)      #
                            (FCODE = ^H3E));
                            PAL Circuit 12-250b
```

MODULE XCM36

Pin Specifications:

(Inputs)

| | |
|---|---|
| REFCLK | PIN 1; |
| RXHAVE | PIN 2; |
| FCODE1 | PIN 3; |
| RXDT01 | PIN 4; |
| RXDT00 | PIN 5; |
| RXDT03 | PIN 6; |
| RXDT05 | PIN 7; |
| RXDT06 | PIN 8; |
| RXDT07 | PIN 9; |
| RXDT14 | PIN 10; |
| RXDT15 | PIN 11; |
| !BSMCLR | PIN 13; |

(Outputs)

| | |
|---|---|
| !MBMCLRA | PIN 15; |
| MBMCLRL | PIN 16; |
| MBBIST | PIN 17; |
| MBMCLR | PIN 18; |
| MYQLT | PIN 19; |
| QLTENB | PIN 20; |
| SYNCLR | PIN 21; |
| SUSPEND | PIN 22; |
| SUSPENDD | PIN 23; |

Equates:

EQUATIONS

```
SUSPENDD    :=  SUSPEND;
SUSPEND     :=  RXHAVE & FCODE1 & RXT\DT01 #
                SUSPEND & !BSMCLR & !(RXHAVE & FCODE 1 &
                RXDT03);
SYNCLR      :=  RXHAVE & FCODE1 & RXDT05;
QLTENB      :=  BSMCLR # FCODE1 & RXHAVE & RXDT15 #
                QLTENB & !(RXHAVE & FCODE1 & RXDT14);
MYQLT       :=  BSMCLR # FCODE1 & RXHAVE & RXDT06 #
                MYQLT & !(RXHAVE & FCODE1 & RXDT07);
MBMCLR      :=  BSMCIR # FCODE1 & RXHAVE & RXDT00 & QLTENB;
MBMCLRA     :=  BSMCIR # FCODE1 & RXHAVE & RXDT00 & QLTENB;
MBBIST      :=  RXHAVE & FCODE1 & RXDT00;
MBMCLRL     :=  BSMCLR # FCODE1 & RXHAVE & RXDT00 & QLTENB;
                EEPROM Busy PAL Circuit 12-250c
```

MODULE XCM62

Pin Specifications:

(Inputs)

| | |
|---|---|
| REFCLK | PIN 1; |
| RXHAVE | PIN 2; |
| RXIORWA | PIN 3; |
| RXWRIT | PIN 4; |
| RXEERW | PIN 5; |
| MBMCLR | PIN 6; |
| TIM12US | PIN 7; |
| TM100US | PIN 8; |

(Outputs)

| | |
|---|---|
| COUNT4H | PIN 14; |
| COUNT3H | PIN 15; |
| COUNT2H | PIN 16; |
| COUNT1H | PIN 17; |
| COUNT0H | PIN 18; |
| COUNT6H | PIN 19; |

|  |  |  |
|---|---|---|
|  | COUNT5H | PIN 20; |
|  | EEBUSY | PIN 23; |
| Equates: |  |  |
| COUNTER | = | [COUNT0H,COUNT1H,COUNT2H,COUNT3H,COUNT4H, COUNT5H,COUNT6H]; |
| EQUATIONS |  |  |
| COUNT6H | := | !COUNT6H & TM100US & EEBUSY # COUNT6H & !TM100US & EEBUSY; |
| COUNT5H | := | !COUNT5H & COUNT6H & TM100US & EEBUSY # COUNT5H 7 !(COUNT6H & TM100US) & EEBUSY; |
| COUNT4H | := | !COUNT4H& COUNT5H & COUNT6H & TM100US & EEBUSY # COUNT4H & !(COUNT5H & COUNT6H & TM100US) & EEBUSY; |
| COUNT3H | := | !COUNT3H & COUNT4H & COUNT5H & COUNT6H & TM100US & EEBUSY # COUNT3H & EEBUSY & !(COUNT4H & COUNT5H & COUNT6H & TM100US); |
| COUNT2H | := | !COUNT2H & COUNT3H & COUNT4H & COUNT5H & COUNT6H & TM100US & EEBUSY # COUNT2H & EEBUSY & !(COUNT3H & COUNT4H & COUNT5H & COUNT6H & TM100US); |
| COUNT1H | := | !COUNTLH & COUNT2H & COUNT3H & COUNT4H & COUNT5H & COUNT6H & TM100US & EEBUSY COUNT1H & EEBUSY & !(COUNT2H & COUNT3H & COUNT4H & COUNT5H & COUNT6H & TM100US); |
| COUNT0H | := | !COUNT0H & COUNT1H & COUNT2H & COUNT3H & COUNT4H & COUNT5H & COUNT6H & TM100US & EEBUSY # COUNT0H & EEBUSY & !(COUNT1H & COUNT2H & COUNT3H & COUNT4H & COUNT5H & COUNT6H & TM100US); |
| EEBUSY | := | RXHAVE & RXIORWA & RXWRIT & RXEERW # EEBUSY & !(MBMCLR # (COUNTER == 109)); |

III. BUS CONTROL 12-24

Power On PAL Circuit

MODULE XCD02

This PAL contains logic to generate the RESET and AHOLD signals used by the microprocessor during its initialization.

|  | Pin Specifications: |  |
|---|---|---|
|  | (Inputs) |  |
|  | REFCLK | PIN 1; |
|  | MBMCLR | PIN 2; |
|  | MBBIST | PIN 3; |
|  | !FLOAT | PIN 5; |
|  | (Outputs) |  |
|  | DBQ0 | PIN 14; |
|  | DBQ1 | PIN 15; |
|  | DBQ2 | PIN 16; |
|  | DBQ3 | PIN 17; |
|  | DBQ4 | PIN 18; |
|  | DBQ5 | PIN 19; |
|  | DBCLR | PIN 20; |
|  | DBAHOLD | PIN 22; |

POWER-UP RESET
AS A RESULT OF POWER-UP RESET, THE OUTPUT PINS WILL BE IN THE FOLLOWING STATE:
DBQ5 . . . 1 - HIGH (DBRESET IS HIGH)
DBAHOLD - LOW
DBCLR - LOW
EQUATIONS

DBCLR := MBMCLR;

```
DBAHOLD      :=  MBMCLR & !FLOAT
             #   MBBIST & !FLOAT
             #   DBAHOLD & DBQ5 & !DBQ0 & !FLOAT
             #   DBAHOLD & DBQ5 & !DBQ1 & !FLOAT
             #   DBAHOLD & DBQ5 & !DBQ2 & !FLOAT
             #   DBAHOLD & DBQ5 & !DBQ3 & !FLOAT
             #   DBAHOLD & DBQ5 & !DBQ4 & !FLOAT;
!DBQ0        :=  MBMCLR
             #   !DBQ5
             #   MBBIST & !DBQ1 & DBQ2 & !DBQ3 & !DBQ4
             #   DBQ0;
!DBQ1        :=  MBMCLR
             #   !DBQ5
             #   DBQ0 & DBQ1
             #   !DBQ0 & !DBQ1;
!DBQ2        :=  MBMCLR
             #   !DBQ5
             #   DBQ0 & DBQ1 & DBQ2
             #   !DBQ0 & !DBQ2
             #   !DBQ1 & !DBQ2;
!DBQ3        :=  MBMCLR
             #   !DBQ5
             #   DBQ0 & DBQ1 & DBQ2 & DBQ3
             #   DBQ2 & !DBQ3
             #   DBQ0 & !DBQ3
             #   DBQ1 & !DBQ3;
!DBQ4        :=  MBMCLR
             #   !DBQ5
             #   DBQ0 & DBQ1 & DBQ2 & DBQ3 & DBQ4
             #   DBQ3 & !DBQ4
             #   DBQ2 & !DBQ4
             #   DBQ0 & !DBQ4
             #   DBQ1 & !DBQ4;
!DBQ5        :=  !MBBIST & !MBMCLR & !DBQ5
             #   !MBMCLR & DBQ4 & !DBQ5
             #   !MBMCLR & DBQ3 & !DBQ5
             #   !MBMCLR & DBQ2 & !DBQ5
             #   !MBMCLR & DBQ1 & !DBQ5
             #   !MBMCLR & DBQ0 & !DBQ5
             #   !MBMCLR & DBQ0 & DBQ1 & DBQ2 & DBQ3 & DBQ4;
                         Reset/Hold PAL Circuit
                            MODULE XCDO3

Pin Specifications:

(Inputs)

DBRESETIN                  PIN 1;
              DBAHOLDIN                  PIN 2;
                             (Outputs)

DBAHOLDOUT                 PIN 18;
              DBRESETOUT                 PIN 19;
EQUATIONS

DBAHOLDOUT = DBAHOLDIN;
DBRESETOUT = DBRESETIN;
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. Power on sequence apparatus for use with a processing unit which couples to a system bus and issues commands to any one of a plurality of units coupled in common with said processing unit for carrying out data processing operations, said processing unit including a microprocessor coupled to a synchronous local bus for issuing said commands to said system bus, said apparatus comprising:

an electrically erasable programmable read only memory (EEPROM) unit including at least first and second groups of addressable locations, each first and second groups including a starting location normally referenced by said microprocessor for executing a boot-up routine sequence when said processing unit is powered on and placed in an initial state, said first group of locations assigned an address space addressable by said microprocessor when in said initial state, said first group of locations storing routines of on-board diagnostic (OBD) routines for testing said processing unit; and, said second group of addressable locations having the same address space addressable by said microprocessor when in said initial state for storing said boot-up routine sequence; and, control circuit means coupled to said EEPROM unit and to said system bus, said control circuit means including mode indicator means having a plurality of states, said mode indicator means being switched to a first state in response to a signal from said system bus generated when said processing unit is powered on, said mode indicator mean when in said first state supplying at least one signal for causing said EEPROM unit to allow said microprocessor to address only said first group of locations including said starting location, storing said OBD routines for enabling both testing and initialization of said processing unit and when said mode indicator means is switched from said first state to a second one of said plurality of states upon completing said testing for supplying a signal for causing said EEPROM unit to allow said microprocessor to address only said second group of locations including said starting location of said boot-up sequence without having to change normal microprocessor addressing for said boot-up routine sequence.

2. Power on sequence apparatus for use with a processing unit which couples to a system bus and issues commands to any one of a plurality of units coupled in common with said processing unit for performing data processing operations, said processing unit including a microprocessor coupled to a synchronous local bus for issuing said commands to said system bus, said apparatus comprising:

an electrically erasable programmable read only memory (EEPROM) unit including at least first and second groups of addressable locations, each first and second groups including a starting location normally referenced by said microprocessor for executing a boot-up routine sequence when said processing unit is powered on and placed in an initial state, said first group of locations assigned an address space addressable by said microprocessor when in said initial state, said first group of locations storing routines of on-board diagnostic (OBD) routines for testing said processing unit; and, said second group of addressable locations having the same address space addressable by said microprocessor when in said initial state for storing said boot-up routine sequence; and, control circuit means coupled to said EEPROM unit and to said system bus, said control circuit means including programmable array logic (PAL) circuit means coupled to said system bus for receiving control and command signals, said PAL including mode indicator means having a plurality of states, said PAL circuit means switching said mode indicator means to a first state in response to a master clear signal from said system bus generated as part of a system initialization procedure when said processing unit is powered on, said mode indicator mean when in said first state supplying at least one signal for causing said EEPROM unit to allow said microprocessor to address only said first group of locations including said starting location, storing said OBD routines for enabling both initialization and testing of said processing unit to verify that said processing unit is operational and when said mode indicator means is switched from said first state to a second one of said plurality of states upon completing said testing for supplying a signal for causing said EEPROM unit to allow said microprocessor to address only said second group of locations including said starting location of said boot-up sequence without having to change normal microprocessor addressing for said boot-up routine sequence.

3. The processing unit of claim 2 wherein said microprocessor includes internal self-test routines and wherein said PAL circuit includes means for generating a reset signal to said microprocessor causing said microprocessor to execute said internal self-test routines for verifying that said microprocessor is operational.

4. The apparatus of claim 3 wherein said processing unit includes register means for storing indications of error conditions, said microprocessor in response to said OBD routines issuing a first I/O command for setting a predetermined indicator when said OBD routines were successfully completed.

5. The apparatus of claim 4 wherein said microprocessor in response to successful completion of said OBD routines issues a second I/O command to suspend its operation awaiting receipt of commands from said system.

6. The apparatus of claim 5 wherein said plurality of units includes a system processor operating under control of an operating system, said system processor upon completion of said processing unit testing, issuing a sequence of I/O commands for determining the operational status of said processing unit and wherein said processing unit further includes a plurality of system visible registers connected to said system bus, different ones of said visible registers for storing system information pertinent to coordinating operations between said processing unit and said system processor and said plurality of system visible registers including said register means, a first I/O command causing said processing unit to read out the contents of register means for determining if said processing unit is operational.

7. The apparatus of claim 6 wherein said system processor upon determining that said processing unit did not successfully execute said OBD routines, issues a second I/O command containing a predetermined function code and bits in certain states, said PAL circuit means in response to said second I/O command generating a reset signal for causing said microprocessor to repeat execution of said built in self-test routines and said OBD routines.

8. The apparatus of claim 6 wherein said system processor upon determining that said processing unit successfully executed said OBD routines issues a number of I/O commands for verifying that said boot routine sequence is valid by causing a data validation operation to be performed.

9. The apparatus of claim 8 wherein said system processor following said number of I/O commands issues a final I/O command containing said predetermined function code having predetermined bits coded to specify a change in mode.

10. The apparatus of claim 9 wherein said PAL circuit means in response to said final I/O command switches said mode indicator from said first state to said second state causing said microprocessor to address said second group of locations to execute said boot routine stored in said EEPROM unit thereby completing initialization.

11. The apparatus of claim 6 wherein said processing unit further includes an addressable local memory coupled to said local bus in common with said microprocessor and wherein said plurality of system visible registers include a memory module register coupled to said system bus and to said microprocessor, said microprocessor in response to said power on signal issuing an I/O command to said system bus specifying loading of said memory module register with a predetermined value during powering up, said predetermined value defining a base address for said local memory as seen from said system bus which places said base address of said local memory outside an address range supported by said system bus preventing interference from other units connected to said system bus.

12. The apparatus of claim 11 wherein said microprocessor during execution of said OBD routines issues an I/O command to said system bus for loading said memory module register with a different value for enabling said processing unit to execute system bus operations without interference from other like processing units connected to said system bus which include local memories.

* * * * *